United States Patent
Jain et al.

(10) Patent No.: US 10,445,299 B2
(45) Date of Patent: Oct. 15, 2019

(54) OPTIMIZING MEMORY BY SHARING DATASETS BETWEEN WORKSPACES

(71) Applicant: SAP SE, Walldorf (DE)

(72) Inventors: Nikita Jain, Bangalore (IN); Devicharan Vinnakota, Bangalore (IN)

(73) Assignee: SAP SE, Walldorf (DE)

( * ) Notice: Subject to any disclaimer, the term of this patent is extended or adjusted under 35 U.S.C. 154(b) by 430 days.

(21) Appl. No.: 15/389,455

(22) Filed: Dec. 23, 2016

(65) Prior Publication Data
US 2018/0181597 A1   Jun. 28, 2018

(51) Int. Cl.
G06F 16/00 (2019.01)
G06F 16/21 (2019.01)
G06F 16/22 (2019.01)
G06F 16/901 (2019.01)
G06F 16/176 (2019.01)
G06F 16/28 (2019.01)

(52) U.S. Cl.
CPC ........... *G06F 16/21* (2019.01); *G06F 16/176* (2019.01); *G06F 16/22* (2019.01); *G06F 16/283* (2019.01); *G06F 16/9024* (2019.01)

(58) Field of Classification Search
CPC ........ G06F 16/21; G06F 16/283; G06F 16/22; G06F 16/9024; G06F 16/176
See application file for complete search history.

(56) References Cited

U.S. PATENT DOCUMENTS

| | | | | |
|---|---|---|---|---|
| 2007/0150525 | A1* | 6/2007 | Idicula | G06F 16/1873 |
| 2007/0150551 | A1* | 6/2007 | Krishnan | G06Q 10/10 |
| | | | | 709/218 |
| 2007/0203902 | A1* | 8/2007 | Bauerle | G06Q 30/02 |
| 2017/0286229 | A1* | 10/2017 | Cheung | G06F 11/1451 |
| 2018/0025040 | A1* | 1/2018 | Goldberg | G06F 16/23 |
| | | | | 707/609 |

* cited by examiner

*Primary Examiner* — Alexander Khong
(74) *Attorney, Agent, or Firm* — Fish & Richardson P.C.

(57) ABSTRACT

Methods and system are disclosed that optimize memory consumed, by sharing datasets between workspaces. In one aspect, multiple workspaces may be instantiated by retrieving multiple datasets from multiple data sources. An input to execute transformations on the multiple datasets may be received. Based on a determination of execution of a transformation on the multiple datasets, a dataset context analyzer may be executed to analyze a current context of data in the multiple datasets. Based on a result of execution of the dataset context analyzer, a transformation graph analyzer may be executed to compute a current context of transformations on the multiple datasets. Based on the determined current context of data and the current context of the transformations on the dataset, memory consumed may be optimized by sharing the multiple datasets between the multiple workspaces.

16 Claims, 6 Drawing Sheets

OPTIMIZING MEMORY BY SHARING DATASETS BETWEEN WORKSPACES

BACKGROUND

Multi-tiered software applications may include multiple integrated components with distinct and unique functionalities. Such software applications may provide instances of workspaces to execute the functionalities or operations on data. When instances of workspaces are generated, a local copy of each instance of the workspace may be created. Sharing data between local copies of each instance of the workspace may be cumbersome. Further, maintaining or tracking changes in the data may be challenging, when multiple users may access the same data via the instance of workspace. Determining modifications of the data with reference to context and sharing the data between the instances of the workspaces, thereby optimizing memory consumed, may be challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

DETAILED DESCRIPTION

Figure 1:
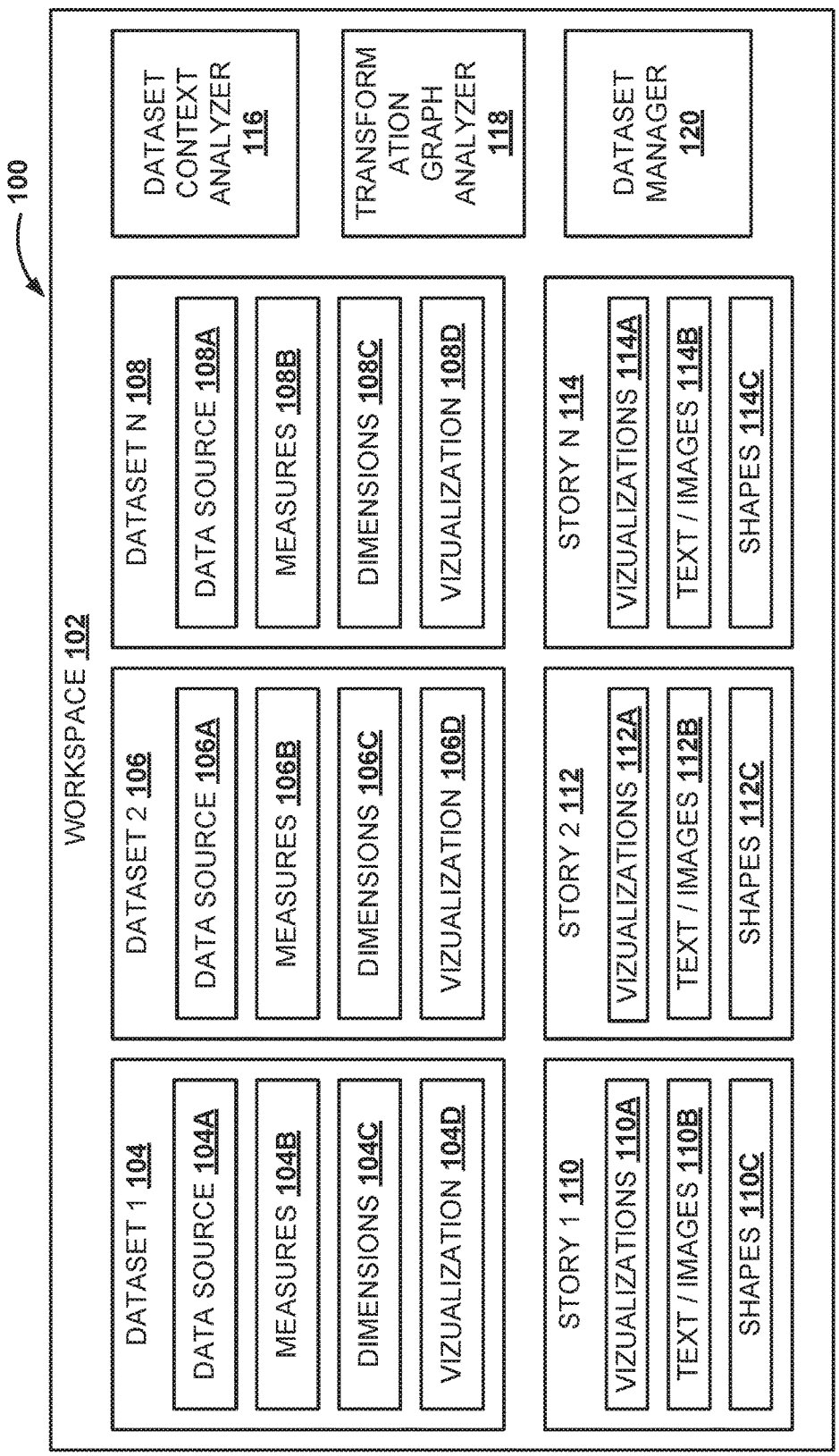
FIG. 1 is a block diagram illustrating an environment to optimize memory by sharing datasets between workspaces, according to an embodiment.

Embodiments of techniques related to optimizing memory by sharing datasets between workspaces are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Volume of enterprise data may grow exponentially with time. In such a scenario, managing storage and access to the data may become challenging and may add to the complexity of existing infrastructure. Further, enterprise applications and systems may access and modify the data. Devising mechanisms to track such modifications in the data may further add to the complexity of storage, maintenance and access to the data.

The enterprise applications and systems may provide integrated environments including workspaces for accessing and modifying the data. The data may be retrieved onto local systems into instances of workspaces. Each instance of workspace may be independent and unique to the local system. A workspace may correspond to an integrated development environment (IDE) including resources (e.g., editors, compilers, assemblers, etc.) for developing software applications or products. The IDE may communicate with multiple distributed data sources over a network (e.g., Internet). The data stores may store the data in multiple formats (e.g., .xls, .csv, .doc, .txt, .ppt, etc.) and may be represented as datasets. When such datasets are retrieved by the IDE, an instance of workspace may be instantiated and a corresponding workspace context may be created.

A workspace context may be unique and may limit the modifications on a dataset. For example, when dataset X is retrieved into workspace A, the access and modification on the dataset X is restricted to workspace A. When data in the dataset X is modified via workspace A, the access to the data modifications may be restricted to workspace A. A copy of the dataset X may be created that may be accessed by another workspace, e.g., workspace B. In an embodiment, creating multiple copies or instances of the data may be redundant and may lead to increase in memory consumed for storing such data. Therefore, by tracking the contexts of data modifications, it may be possible to share the datasets between multiple users (or respective workspaces, for example, dataset X may be shared between workspaces A and B). Such sharing of the datasets may optimize memory consumption and the performance (e.g., functional efficiency) of the workspaces. In an embodiment, optimizing may correspond to improving performance of workspaces, amount of memory consumed for storing multiple datasets in the data sources, etc. Therefore, the memory consumed by the datasets may be reduced, when the datasets are shared between the multiple workspaces.

FIG. 1 is a block diagram illustrating environment 100 to optimize memory by sharing datasets between workspaces, according to an embodiment. FIG. 1 shows workspace 102 including multiple datasets (e.g., 104, 106, 108, 110, 112, 114, etc.) that may be associated with corresponding data sources (e.g., 104A, 106A, 108A, etc.). Upon instantiating workspace 102, datasets (e.g., one or more of 104, 106, 108, 110, 112, 114, etc.) may be retrieved from the respective data sources. In an embodiment, datasets (e.g., 104, 106, 108, 110, 112, 114, etc.) may be associated with multiple attributes or parameters represented as measures, dimensions, visualizations, text/images, shapes, etc. (e.g., 104B, 104C, 104D, 106B, 106C, 106D, 108B, 108C, 108D, 110A, 110B, 110C, 112A, 112B, 112C, 114A, 114B, 114C, etc.).

In an embodiment, when datasets (e.g., 104, 106, 108, 110, 112, 114, etc.) are retrieved, workspace 102 may be instantiated and a workspace context may be created. The workspace context may define contextual boundary that may restrict the modification of data in the datasets (e.g., 104, 106, 108, 110, 112, 114, etc.) within the context of workspace 102. The workspace contexts may be used to control a state of an application workspace. For example, when a user instantiates the workspace, controlling the state of the application workspace may correspond to controlling data or objects including data in memory (e.g., schema, transformed data, etc.). In an embodiment, controlling the state of the application workspace may restrict an access of the data or objects within a context of application workspace.

In an embodiment, when multiple workspaces are instantiated, correspondingly multiple workspace contexts may be created. When identical datasets (e.g., same datasets are retrieved from the same data sources) are retrieved into the multiple workspaces, the datasets (e.g., 104, 106, 108, 110, 112, 114, etc.) may be correspondingly restricted to the specific contexts of the multiple workspaces. When a user executes transformations (e.g., modify, add, delete, append, etc.) on datasets (e.g., 104, 106, 108, 110, 112, 114, etc.), the transformations may create multiple transformation contexts for the datasets (e.g., 104, 106, 108, 110, 112, 114, etc.). In an embodiment, current context of data in datasets (e.g., 104, 106, 108, 110, 112, 114, etc.) and a current context of transformation on datasets (e.g., 104, 106, 108, 110, 112, 114, etc.) may be determined. Based on such determination, a decision logic associated with the workspace may determine whether datasets (e.g., 104, 106, 108, 110, 112, 114, etc.) may be shared between multiple workspaces.

In an embodiment, multiple algorithms may be executed and work in cooperation with the workspaces to determine the current context of datasets and the current context of transformations on datasets. For example, to determine the current context of datasets, a routine (e.g., set of instructions executed by a processor of a computer) related to dataset context analyzer 116 may be executed. The execution of the routine related to the dataset context analyzer 116 may determine the current context of data in the datasets. Based on the response of the dataset context analyzer 116, a routine related to transformation graph analyzer 118 may be executed. The execution of the routine related to the transformation graph analyzer 118 may compute the current context of the transformation on datasets. In an embodiment, based on the determined current context of the data and the current context of the transformations of data in datasets, a routine related to dataset manager 120 may determine whether the datasets may be shared between the workspaces. For example, the decision logic to determine whether the datasets may be shared between the workspaces may include determining whether the datasets have the same measures and dimensions, determining whether the datasets are from the same sources (e.g., data stores, databases, etc.), whether the datasets are equal or include common subsets. Based on such determinations, a dataset manager associated with the workspace may determine whether to share the datasets between the workspaces. In an embodiment, when the datasets are shared between the workspaces, memory consumed by datasets is reduced and hence the performance of the workspaces may be optimized.

Figure 2:
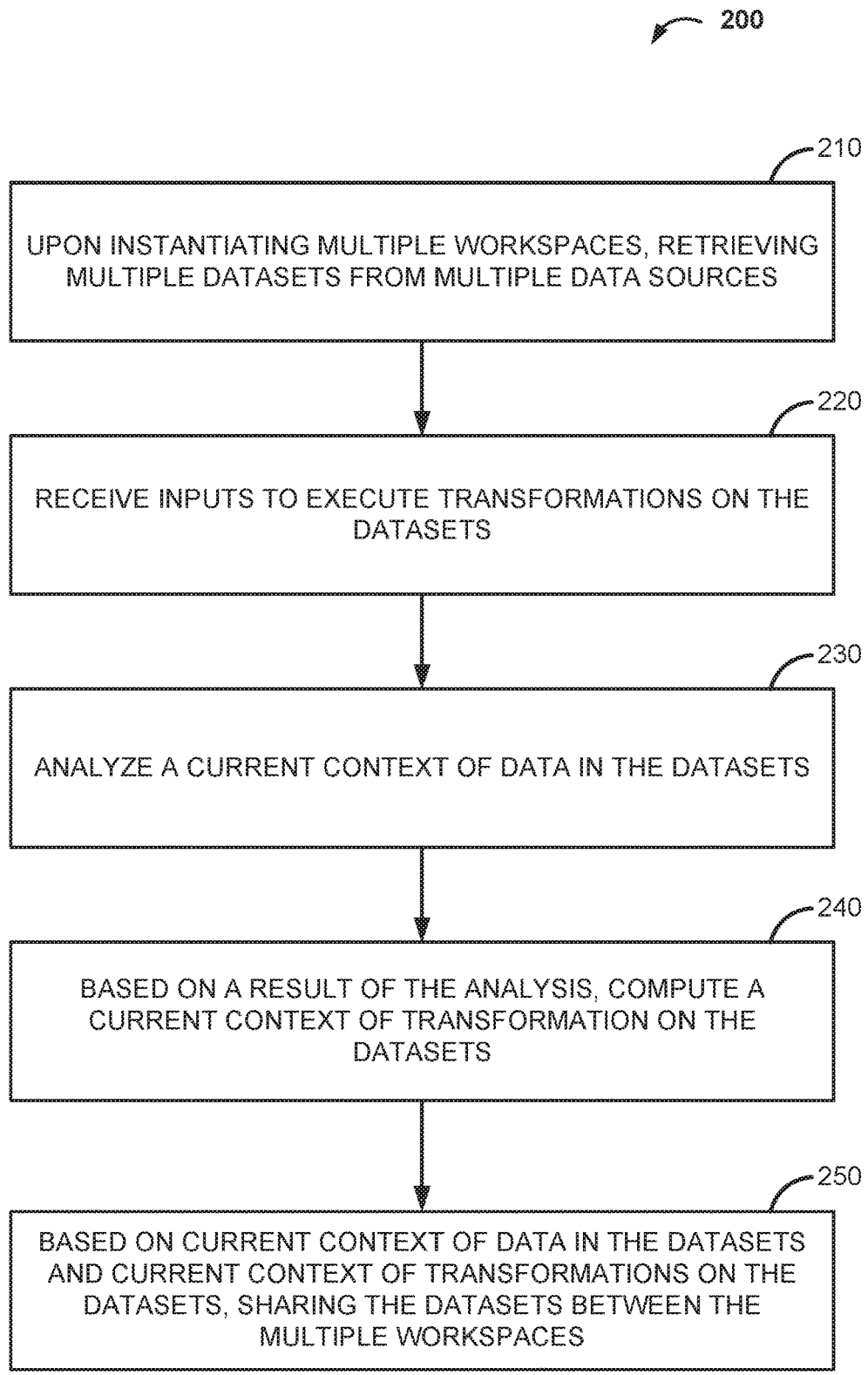
FIG. 2 is a flow diagram illustrating a process to optimize memory by sharing datasets between workspaces, according to an embodiment.

FIG. 2 is a flow diagram illustrating process 200 to optimize memory by sharing datasets between workspaces, according to an embodiment. When multiple datasets are shared between multiple workspaces, memory consumed may be reduced and the performance of the multiple workspaces may be optimized. In an embodiment, upon instantiating workspaces, datasets are retrieved from data sources into the workspaces, at 210. Multiple datasets may be retrieved into the workspaces from multiple data sources. The datasets may be associated with attributes or parameters such as, measures, dimensions, visualizations, etc. In an embodiment, a measure may correspond to a property on which calculations may be executed. Dimensions may correspond to structures that may categorize the measures. Visualizations may correspond to converting data into visual representation. In an embodiment, when datasets are retrieved from data sources into the workspaces, a corresponding workspace contexts may be created.

In an embodiment, inputs to execute transformations on datasets is received, at 220. The received inputs may correspond to executing transformations on the data in the datasets including modifying (e.g., edit, delete, add, append, etc.) the data or dimensions of the data by a user. For example, the user may execute transformations for adding or appending data to the datasets, deleting data from the datasets, modifying content in the datasets, etc. Such transformations on the datasets may be determined and based on such determination, the current context of the data in the datasets is analyzed, at 230. For example, the current context of transformation on the datasets may be determined by comparing the original dataset (e.g., before transformation) with the current dataset (e.g., after executing transformations). In an embodiment, the current context of the data in the datasets is analyzed by a dataset context analyzer (e.g., routine related to dataset context analyzer may be executed by a processor of a computing system).

In an embodiment, based on the dataset context analysis, a current context of the transformation on the datasets is computed, at 240. In an embodiment, a transformation graph analyzer (e.g., routine related to transformation graph analyzer may be executed by processor of the computing system) may be executed to compute the current context of the transformations on the datasets. The current context of the transformations on the dataset may indicate type of transformation, number of transformations, etc., that may be executed on the datasets. For example, type of transformations may include duplicating dimensions associated with the dataset, deleting dimensions associated with the dataset, renaming dimensions associated with the dataset, etc. Based on a determination of the current context of the data in the datasets and the current context of the transformations on the datasets, the multiple datasets may be shared between the multiple workspaces. For example, as discussed previously, the decision logic to determine whether the datasets may be shared between the workspaces may include determining whether the datasets have the same measures and dimensions, determining whether the datasets are from the same sources (e.g., data stores, databases, etc.), whether the datasets are equal or include common subsets. In an embodiment, based on the current context of data in the datasets and the current context of the transformations on the datasets, the datasets are shared between the workspaces, at 250. In an embodiment, the datasets may be shared between the workspaces based on a decision logic and such sharing of the datasets between the workspaces may optimize the memory. For example, the decision logic may include determining whether the current context of the transformations on datasets are equal or not in two or more workspaces. In an embodiment, when the current context of the transformations on datasets between at least two workspaces are determined to be equal, the datasets may be shared between the workspaces, e.g., by a dataset manager. The sharing of datasets between multiple workspaces may optimize the performance of the workspaces, optimize the memory consumed by the datasets, etc.

In an embodiment, the execution of routine related to dataset context analyzer may analyze a current context of the data in the datasets. The dataset context analyzer may analyze the context of data in the datasets before the execution of the transformations, after the execution of the transformations, etc., and generate a result of the analysis. The analysis may include a comparison of the contexts of data (e.g., before the execution of the transformations, after the execution of the transformations, etc.) and the result of analysis (e.g., 'similar', 'different', 'equal', etc.) may be generated. When the result of the analysis is determined as 'different', it may be represented by delta that may correspond to a degree of change in contexts of the data. In an embodiment, the dataset context analyzer may further analyze by comparing the contexts of the data in the datasets to determine whether the datasets (e.g., $D_{S1}$ and $D_{S2}$) are retrieved from same data source (e.g., identical data sources $D_{X1}$ and $D_{X2}$; that is, whether $D_{X1}=D_{X2}$); determine whether the attributes (measure, dimensions, etc.) associated with the datasets are same (e.g., identical); determination of the data in the datasets, before and after the transformations, etc.

In an embodiment, upon instantiating two workspaces (e.g., A and B), consider that a dataset (e.g., dataset X, a spreadsheet file including data in a matrix of cells of rows and columns) is retrieved from a data source into the two workspaces. Correspondingly, two workspace contexts may be created and the dataset context analyzer may be executed to determine the current context of the data in the dataset on the retrieved dataset X. In an embodiment, consider that a first user via workspace A executes transformations (e.g., add, delete or modify data in one or more cells, one or more rows, one or more columns, etc.) on the dataset X and saves these transformations, which may be stored in the data source. In a subsequent interval of time, consider that second user accesses dataset X via workspace B. In an embodiment, the dataset context analyzer may be executed to analyze the context of data in the dataset X. The first and second user may access and work on the shared dataset X, which may include the transformations executed by the first user via workspace A Since the dataset X was previously accessed by the first user via workspace A and transformations were executed, the execution of dataset manager may determine that the context of data in the dataset X is now changed (e.g., by comparing the contexts of the data with the original dataset X). In an embodiment, the dataset X including transformed data may correspond to a current context of the data.

In an embodiment, based on the result of the determination of the current context of the data, the transformation graph analyzer may be executed to compute the current context of the transformations (e.g., the changes or modifications on the data) in the dataset (e.g., by comparing the original dataset X and the dataset X including transformed data). When the current contexts of the dataset in the two workspaces and the current context of transformation (e.g., delta, which may correspond to change based on transformation) are equal (e.g., same or identical, based on the decision logic, as discussed above), the dataset X may be shared between the two workspaces (e.g., A and B) and a reference count associated with the dataset may be set to 2. When a user stops accessing the dataset from one of the two workspaces (e.g., A or B), the reference count associated with the dataset may be decreased to 1. When users stop accessing the datasets from the instantiated workspaces (e.g., both workspaces A and B), the reference count associated with the dataset is decreased to 0. In an embodiment, when the current context of data and the current context of transformation are not equal, the dataset X may not be shared between the two workspaces.

In an embodiment, when a transformation is executed on the dataset that is shared between two or more workspaces, the dataset may be forked (e.g., different contexts of datasets may be generated). The forking of the dataset may correspond to generation of a new context of the dataset including the original data, when the transformations are executed in a workspace from the two or more workspaces where the dataset is shared. When the datasets are forked, the original data in the datasets may be replicated and the users of the two or more workspaces may correspondingly access and work (e.g., execute transformations) on the forked datasets. In an embodiment, the dataset manager may determine an event of forking of the dataset, and may stop sharing the datasets between the workspaces. Local copies of the datasets may be created that may be accessed by respective instances of the workspaces.

Figure 3:
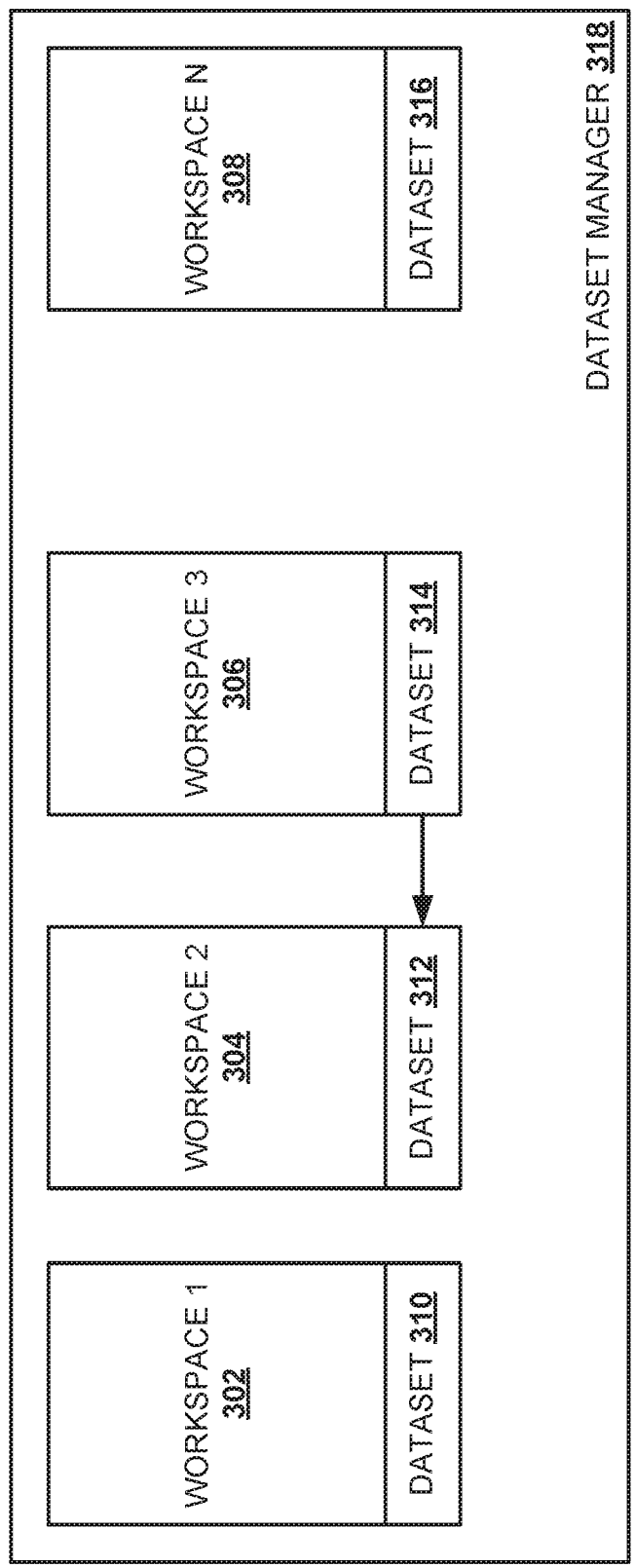
FIG. 3 is a block diagram illustrating instantiation of multiple workspaces by retrieving multiple datasets from multiple data stores, according to an embodiment.

FIG. 3 is a block diagram illustrating instantiation of multiple workspaces by retrieving multiple datasets from multiple data stores, according to an embodiment. FIG. 3 shows instantiation of multiple workspaces (e.g., 302, 304, 306, and 308) by retrieving multiple datasets (e.g., 310, 312, 314, and 316) from multiple data sources. In an embodiment, corresponding multiple workspace contexts may be created and the workspace contexts or multiple workspaces (e.g., 302, 304, 306, and 308) may work in cooperation with a dataset manager 318. As discussed previously, the dataset context analyzer may be executed to determine the current context of data in multiple datasets (e.g., 310, 312, 314, and 316). Based on the response of the execution of the dataset context analyzer, the transformation graph analyzer may be executed to compute the current context of transformations on the datasets. When the current context of the data and the current context of transformations on the datasets are determined as equal (e.g., based on the decision logic and comparison of the datasets (the original dataset and the dataset including transformation), dataset manager 318 may share the datasets between one or more workspaces (e.g., FIG. 3 shows dataset 314 is shared between workspaces 306 and 304 indicated by an arrow). In an embodiment, such sharing of the datasets between the workspaces may optimize the performance of the workspaces and the memory consumed by the datasets and the workspaces.

Figure 4:
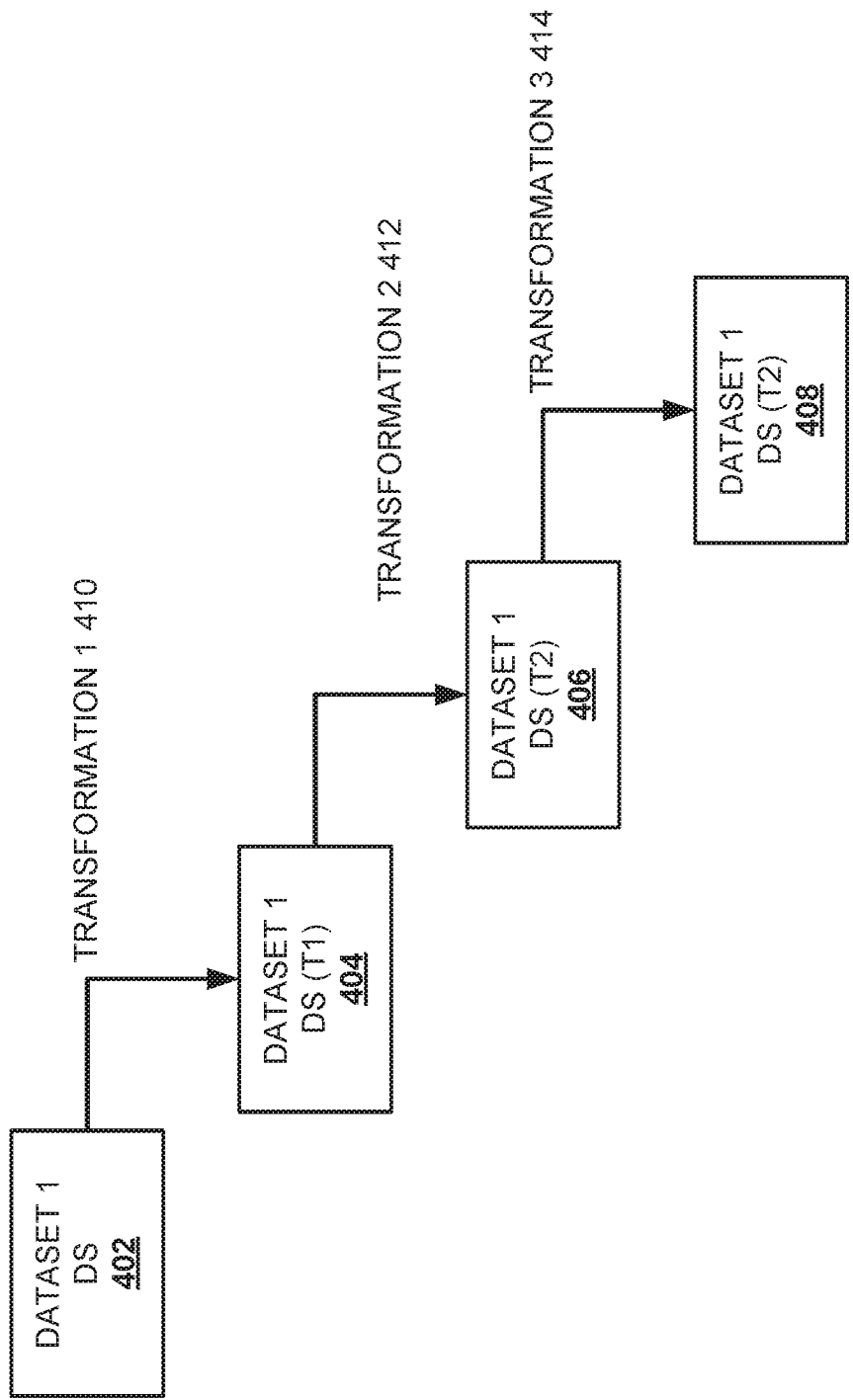
FIG. 4 is a block diagram illustrating execution of multiple transformations on a dataset, according to an embodiment.

FIG. 4 is a block diagram illustrating execution of multiple transformations on a dataset, according to an embodiment. FIG. 4 exemplary illustrates the execution of multiple transformations (e.g., transformation 1 410, transformation 2 412, transformation 3 414, etc.) on dataset 1 DS 402. When transformation 1 410 is executed on dataset 1 DS 402, dataset 1 DS (T1) 404 may be generated. Sequentially, when transformation 2 412 is executed on dataset 1 DS (T1) 404, dataset 1 DS (T2) 406 may be generated, when transformation 3 414 is executed on dataset 1 DS (T2) 406, dataset 1 DS (T2) 408 may be generated, and so on.

In an embodiment, let dataset 1 $D_1$ be associated with a data source $D_{X1}$ where the original dataset context is represented by $DS_{1X}$. For example, when the following transformations are executed on dataset 1 $D_1$:

$T_1$: duplicate a dimension $d_1$ such that $DS_{1X}$ transforms to $DS_{1X}T_1$      Equation (1)

$T_2$: delete a duplicate dimension such that $DS_{1X}T_1$ transforms to $DS_{1X}T_2$      Equation (2)

$T_3$: rename a dimension $d_2$ such that $DS_{1X}T_2$ transforms to $DS_{1X}T_3$      Equation (3)

In an embodiment, upon executing the above transformations, the current context of the dataset may be represented by:

$$DS_{1X}T_3 = DS_{1X} + T_1 + T_2 + T_3 \qquad \text{Equation (4)}$$

In an embodiment, the delta or change in context of the data, when the transformations are executed, may be computed by:

$$\text{delta } 1(T_1+T_2+T_3) = DS_{1X}T_3 - DS_{1X} \qquad \text{Equation (5)}$$

Figure 5:
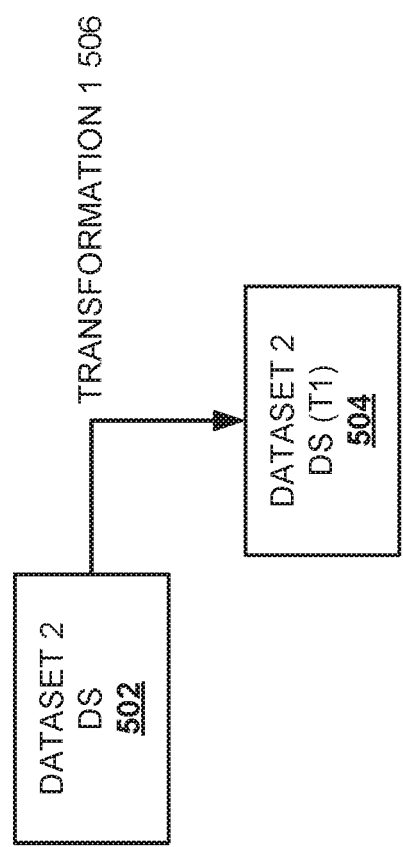
FIG. 5 is a block diagram illustrating an execution of a transformation on a dataset, according to an embodiment.

FIG. 5 is a block diagram illustrating execution of a transformation on a dataset, according to an embodiment. FIG. 5 illustrates an execution of a transformation (e.g., transformation 1 506) on a dataset (e.g., dataset 2 DS 502). When transformation 1 506 is executed on dataset 2 DS 502, dataset 2 DS (T1) 504 may be generated.

In an embodiment, let dataset 2 $D_2$ be associated with a data source $D_{X2}$ where the original dataset context is represented by $DS_{2X}$. For example, when the following transformations is executed on dataset 2 $D_2$:

$$T_1\text{: rename a dimension } D_2 \text{ such that } DS_{2X} \text{ transforms to } DS_{2X}T_1 \qquad \text{Equation (6)}$$

In an embodiment, upon executing the above transformation, the current context of the dataset may be represented by:

$$DS_{2X}T_1 = DS_{2X} + T_1 \qquad \text{Equation (7)}$$

In an embodiment, the delta or change in context of the data, when the transformations are executed, may be computed by:

$$\text{delta } 2(T_1) = DS_{2X}T_1 - DS_{2X} \qquad \text{Equation (8)}$$

In an embodiment, based on the decision logic, as discussed previously, the dataset manager may determine whether delta 1 is equal to delta 2 (e.g., from equation (5) and equation (8)). In an embodiment, when the dataset manager determines that the current context of data and the current context of transformations on the datasets are equal, the dataset manager may share the datasets $D_1$ and $D_2$ between workspaces. Sharing the datasets may optimize the performance of the workspaces and the memory consumed by the workspaces. In an embodiment, when the current context of the data and the current context of transformation on the data are not equal, the dataset manager may determine that delta 1 is not equal to delta 2, and accordingly the dataset manager may not share the datasets between the workspaces.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a tangible computer readable storage medium. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
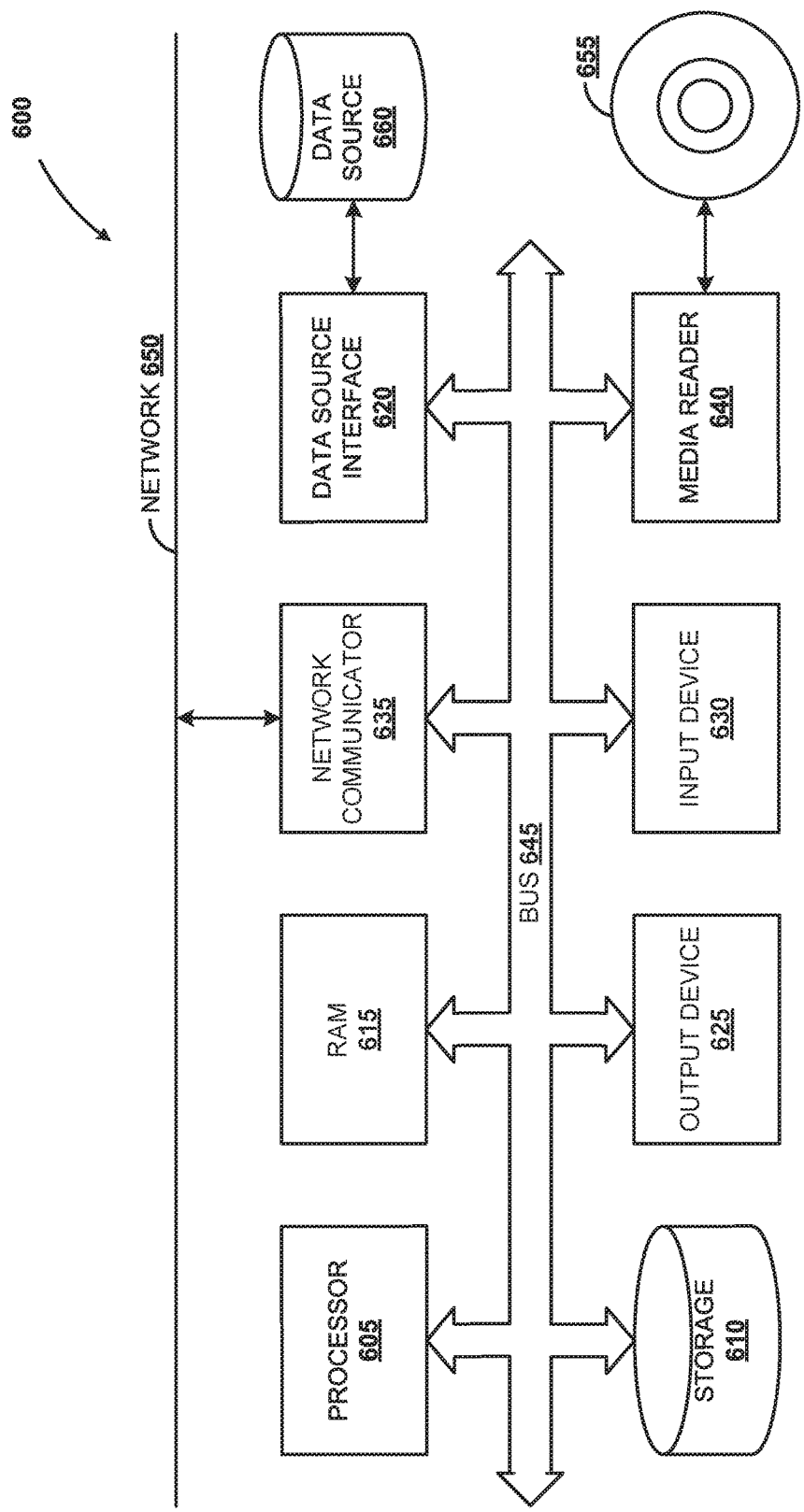
FIG. 6 is a block diagram of an exemplary computer system, according to an embodiment.

FIG. 6 is a block diagram of an exemplary computer system 600, according to an embodiment. Computer system 600 includes processor 605 that executes software instructions or code stored on computer readable storage medium 655 to perform the above-illustrated methods. For example, software instructions or code stored on computer readable storage medium 655 may correspond to the optimization algorithms, estimation algorithms, generate an optimum execution schedule, calculating processor idle times during the transformation of business data, determining whether to rearrange the transformation of business data in the tables between the processors, etc. Processor 605 can include a plurality of cores. Computer system 600 includes media reader 640 to read the instructions from computer readable storage medium 655 and store the instructions in storage 610 or in random access memory (RAM) 615. Storage 610 provides a large space for keeping static data where at least some instructions could be stored for later execution. According to some embodiments, such as some in-memory computing system embodiments, RAM 615 can have sufficient storage capacity to store much of the data required for processing in RAM 615 instead of in storage 610. In some embodiments, all of the data required for processing may be stored in RAM 615. The stored instructions may be further compiled to generate other representations of the instructions and dynamically stored in RAM 615. Processor 605 reads instructions from RAM 615 and performs actions as instructed. According to one embodiment, computer system 600 further includes output device 625 (e.g., a display) to provide at least some of the results of the execution as output including, but not limited to, visual information to users and input device 630 to provide a user or another device with means for entering data and/or otherwise interact with computer system 600. Each of these output devices 625 and input devices 630 could be joined by one or more additional peripherals to further expand the capabilities of computer system 600. Network communicator 635 may be provided to connect computer system 600 to network 650 and in turn to other devices connected to network 650 including other clients, servers, data stores, and interfaces, for instance. The modules of computer system 600 are interconnected via bus 645. Computer system 600 includes a data source interface 620 to access data source 660. Data source 660 can be accessed via one or more abstraction layers implemented in hardware or software. For example, data source 660 may be accessed by network 650. In some embodiments data source 660 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to optimize memory consumption, by sharing datasets between workspaces, comprising:
    upon instantiating a plurality of workspaces, retrieving a plurality of datasets from one or more data sources into the plurality of workspaces, wherein a plurality of workspace contexts are defined corresponding to the plurality of workspaces, wherein a workspace context of the plurality of workspace contexts defines boundaries for accessing data from a corresponding dataset in relation to an execution of a transformation, and wherein a first dataset from the plurality of datasets is provided into at least two workspaces and is associated with at least two contexts correspondingly defined at the at least two workspaces;
    receiving an input to execute a transformation on the first dataset from the plurality of datasets to generate a transformed dataset, the transformation being executed at a first workspace of the at least two workspaces, wherein the transformed dataset is stored at a data source corresponding to the first dataset after executing the transformation;
    based on the transformation, analyzing a first current context of data in the first dataset in the first workspace of the at least two workspaces and a second current context of the data in a second workspace, wherein the second workspace is different from the first workspace;
    based on the analysis of the first current context of data in the first workspace, computing a third current context of transformation on the first dataset, wherein the current context of the transformation on the first dataset is determined by comparing the first dataset prior to executing the transformation and the transformed dataset; and
    when the first current context of data in the first workspace, the second current context of the data in the second workspace, and the third current context of the transformation of the first dataset are equal, providing the transformed dataset as shared between the first workspace and the second workspace to optimize the memory consumption.

2. The computer implemented method of claim 1, further comprising analyzing a current context of the data in one or more datasets, comprises:
    based on a comparison of one or more contexts of the one or more datasets, determining whether the one or more datasets are retrieved from an identical data source of the one or more data sources;
    determining whether one or more attributes associated with the one or more datasets are identical; and
    based on the comparison and the determination that the one or more datasets are identical, determining the current context of data in the one or more datasets.

3. The computer implemented method of claim 2, wherein the one or more attributes associated with the one or more datasets are selected from a group consisting of a measure, a dimension and a visualization.

4. The computer implemented method of claim 1, further comprises:
    when the plurality of workspaces are instantiated, map the plurality of datasets from the one or more data sources to the plurality of workspaces by the dataset manager.

5. The computer implemented method of claim 1, wherein the transformation is selected from a group consisting of: adding data to the first dataset, deleting data from the first dataset, and modifying data from the first dataset.

6. A computer system to optimize memory consumed, by sharing datasets between workspaces, comprising:
a memory storing computer instructions; and
a processor communicatively coupled with the memory to execute the instructions to perform operations, comprising:
upon instantiating a plurality of workspaces, retrieving a plurality of datasets from one or more data sources into the plurality of workspaces, wherein a plurality of workspace contexts are defined corresponding to the plurality of workspaces, wherein a workspace context of the plurality of workspace contexts defines boundaries for accessing data from a corresponding dataset in relation to an execution of a transformation, and wherein a first dataset from the plurality of datasets is provided into at least two workspaces and is associated with at least two contexts correspondingly defined at the at least two workspaces;
receiving an input to execute a transformation on the first dataset the plurality of datasets to generate a transformed dataset, the transformation being executed at a first workspace of the at least two workspaces, wherein the transformed dataset is stored at a data source corresponding to the first dataset after executing the transformation
based on the transformation, analyzing a first current context of data in the first dataset in the first workspace of the at least two workspaces and a second current context of the data in a second workspace, wherein the second workspace is different from the first workspace;
based on the analysis of the first current context of data in the first workspace, computing a third current context of transformation on the first dataset, wherein the current context of the transformation on the first dataset is determined by comparing the first dataset prior to executing the transformation and the transformed dataset; and
when the first current context of data in the first workspace, the second current context of the data in the second workspace, and the third current context of the transformation of the first dataset are equal, providing the transformed dataset as shared between the first workspace and the second workspace to optimize the memory consumption.

7. The computer system of claim 6, wherein the memory further comprises instructions which when executed cause to perform:
analyzing a current context of the data in one or more datasets comprising:
based on a comparison of one or more contexts of the one or more datasets, determining whether the one or more datasets are retrieved from an identical data source of the one or more data sources;
determining whether one or more attributes associated with the one or more datasets are identical; and
based on the comparison and the determination that the one or more datasets are identical, determining the current context of data in the one or more datasets.

8. The computer system of claim 7, wherein the one or more attributes associated with the one or more datasets are selected from a group consisting of a measure, a dimension and a visualization.

9. The computer system of claim 6, further comprising:
when the plurality of workspaces are instantiated, map the plurality of datasets from the one or more data sources to the plurality of workspaces by the dataset manager.

10. The computer system of claim 6, wherein the transformation is selected from a group consisting of: adding data to the first dataset, deleting data from the first dataset, and modifying data from the first dataset.

11. A non-transitory computer readable storage medium tangibly storing instructions, which when executed by a computer, cause the computer to execute operations comprising:
upon instantiating a plurality of workspaces, retrieving a plurality of datasets from one or more data sources into the plurality of workspaces, wherein a plurality of workspace contexts are defined corresponding to the plurality of workspaces, wherein a workspace context of the plurality of workspace contexts defines boundaries for accessing data from a corresponding dataset in relation to an execution of a transformation, and wherein a first dataset from the plurality of datasets is provided into at least two workspaces and is associated with at least two contexts correspondingly defined at the at least two workspaces;
receiving an input to execute a transformation on the first dataset from the plurality of datasets to generate a transformed dataset, the transformation being executed at a first workspace of the at least two workspaces, wherein the transformed dataset is stored at a data source corresponding to the first dataset after executing the transformation;
based on the transformation, analyzing a first current context of data in the first dataset in the first workspace of the at least two workspaces and a second current context of the data in a second workspace, wherein the second workspace is different from the first workspace;
based on the analysis of the first current context of data in the first workspace, computing a third current context of transformation on the first dataset, wherein the current context of the transformation on the first dataset is determined by comparing the first dataset prior to executing the transformation and the transformed dataset; and
when the first current context of data in the first workspace, the second current context of the data in the second workspace, and the third current context of the transformation of the first dataset are equal, providing the transformed dataset as shared between the first workspace and the second workspace to optimize the memory consumption.

12. The non-transitory computer readable storage medium of claim 11, further comprising instructions, which when executed cause to
analyze a current context of the data in the plurality of datasets, comprising:
based on a comparison of one or more contexts of the one or more datasets, determining whether the one or more datasets are retrieved from an identical data source of the one or more data sources;
determining whether one or more attributes associated with the one or more datasets are identical; and
based on the comparison and the determination that the one or more datasets are identical, determining the current context of data in the one or more datasets.

13. The non-transitory computer readable storage medium of claim 12, wherein the one or more attributes associated with the one or more datasets are selected from a group consisting of a measure, a dimension and a visualization.

14. The non-transitory computer readable storage medium of claim 11, further comprising:
   when the plurality of workspaces are instantiated, map the plurality of datasets from the one or more data sources to the plurality of workspaces by the dataset manager.

15. The method of claim 1, further comprising;
   associating a reference count to the first dataset, wherein the reference count defines a number of workspaces between which the first dataset is shared; and
   adjusting the reference count when the first dataset is shared between the first workspace and the second workspace.

16. The method of claim 1, further comprising, when the first current context of data in the first workspace, the second current context of the data in the second workspace, and the current context of the transformation of the first dataset are different:
   replicating the first dataset into a second copy of the first dataset to correspond to the second workspace, wherein the second copy of the first dataset is provided for accessing and transformation executions from the second workspace independent of the first dataset provided from the first workspace.

\* \* \* \* \*